United States Patent
Yanagihara et al.

(10) Patent No.: US 7,861,115 B2
(45) Date of Patent: Dec. 28, 2010

(54) MULTI-COMPONENT SYSTEM

(75) Inventors: Norihisa Yanagihara, Tokyo (JP);
Hajime Kihara, Funabashi (JP);
Tsutomu Yamada, Hitachinaka (JP);
Makiko Naemura, Tokyo (JP); Kenji Seino, Chiba (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 353 days.

(21) Appl. No.: 12/215,063

(22) Filed: Jun. 24, 2008

(65) Prior Publication Data

US 2009/0013221 A1    Jan. 8, 2009

(30) Foreign Application Priority Data

Jun. 25, 2007 (JP) ............................. 2007-166383

(51) Int. Cl.
*G06F 11/00* (2006.01)

(52) U.S. Cl. ..................... 714/23; 714/55; 713/310; 713/324

(58) Field of Classification Search ............. 714/23, 714/55; 713/310, 324
See application file for complete search history.

(56) References Cited

U.S. PATENT DOCUMENTS

| | | | |
|---|---|---|---|
| 4,553,204 A * | 11/1985 | Hashimoto | 714/24 |
| 4,835,671 A * | 5/1989 | Sato et al. | 700/81 |
| 5,086,505 A | 2/1992 | Goldberg et al. | |
| 5,524,206 A * | 6/1996 | Saito | 714/23 |
| 5,583,987 A * | 12/1996 | Kobayashi et al. | 714/13 |
| 6,393,590 B1 * | 5/2002 | Wood et al. | 714/55 |
| 6,714,996 B1 * | 3/2004 | Kobayashi | 710/5 |
| 6,912,670 B2 * | 6/2005 | Wilkie | 714/13 |
| 7,137,020 B2 * | 11/2006 | Gilstrap et al. | 713/324 |
| 7,467,322 B2 * | 12/2008 | Baba | 714/4 |
| 2002/0152425 A1 * | 10/2002 | Chaiken et al. | 714/23 |
| 2005/0086460 A1 | 4/2005 | Huang | |

FOREIGN PATENT DOCUMENTS

| | | |
|---|---|---|
| EP | 0679981 A2 | 4/1995 |
| GB | 2415799 A | 1/2006 |

(Continued)

OTHER PUBLICATIONS

The European Patent Office (EPO) Search Report for EPO patent application EP08252138 (Oct. 2, 2008).

*Primary Examiner*—Philip Guyton
*Assistant Examiner*—Charles Ehne
(74) *Attorney, Agent, or Firm*—Townsend and Townsend and Crew LLP

(57) ABSTRACT

To reset only the CPU in a component in an abnormal condition without affecting CPUs of components in a normal condition, a multi-component system, in which a plurality of components each including at least a CPU are connected via a common bus to each other, includes a first reset signal generating unit which generates a reset signal by a switch operation to send the reset signal to respective components and a judge unit which is disposed in each component to determine whether or not resetting of a CPU is allowed. The judge unit inhibits, if the CPU is in a normal condition, the resetting of the CPU in response to the reset signal and resets, if the CPU is in an abnormal condition, the CPU in response to the reset signal.

9 Claims, 4 Drawing Sheets

FOREIGN PATENT DOCUMENTS

| | | |
|---|---|---|
| JP | 05-290008 | 11/1993 |
| JP | 09-319467 | 12/1997 |
| JP | 11-177594 | 7/1999 |
| JP | 2004-005280 | 1/2004 |
| WO | 2007/049162 A2 | 5/2007 |

* cited by examiner

MULTI-COMPONENT SYSTEM

INCORPORATION BY REFERENCE

The present application claims priority from Japanese application JP 2007-166383 filed on Jun. 25, 2007, the content of which is hereby incorporated by reference into this application.

BACKGROUND OF THE INVENTION

The present invention relates to a multi-component system including a plurality of components connected via a common bus such as a Local Area Network (LAN) to each other, each of the component including at least a Central Processing Unit (CPU), and in particular to, a scheme of resetting a CPU which is in an abnormal condition in any one of the components.

In the prior art, there is known a multi-CPU system in which a plurality of CPUs are connected via a common bus including a reset line to each other and the overall processing is divided among the CPUs. For example, JP-A-5-290008 describes a technique for such multi-CPU system in which a CPU is reset according to designation from an application in execution.

The technique is used in a system including a plurality of sub-racks (components) each of which including at least a CPU module. During the operation of the system, when an application program being executed by a CPU module of either one of the subracks indicates a system reset, a system reset request is issued. The CPU module acquires the right to reset and then resets a CPU module in an associated sub-rack via the reset line.

SUMMARY OF THE INVENTION

In the system described in JP-A-5-290008, the CPU modules of the sub-racks, i.e., the components of the system execute respective portions of the overall processing. In response to the system reset request, the CPU modules of all components are simultaneously reset. In a system including a plurality of components which respectively execute processings in a mutually independent fashion, if the CPU modules of all components are simultaneously reset in response to the reset signal as in the system of JP-A-5-290008, any CPU module normally executing processing is also reset. This leads to a problem that the data processed up to this point is lost and hence the processing thus executed becomes useless.

To solve the problem, at occurrence of an abnormal condition in a CPU module of a component, it can be considered to reset, for example, only the CPU module in the abnormal condition of the component. For this purpose, each time either one of the CPU modules is in an abnormal condition, it is required for the operator to detect the component in which the CPU unit is in the abnormal condition. This is quite a troublesome job for the operator.

There is also known a technique using a WatchDog Time (WDT) in each CPU. The WDT continuously monitors the condition of the CPU. At detection of an abnormal condition of the CPU, the WDT resets the CPU. It can be hence considered, in a system including a plurality of components each including a CPU module, to dispose a WDT for each component. If one of the CPU unit of the component drops to an abnormal condition, the WDT resets the CPU module. This makes it possible to reset only the CPU module in the abnormal condition.

According to this method, the CPU module in the abnormal condition is automatically reset regardless of intention of the operator. However, at occurrence of an abnormality in the system, the operator desires depending on cases to fully confirm the abnormality or to detect the component associated with the abnormality to secure data processed by the CPU in the abnormal condition. In the method, the CPU module in the abnormal condition is automatically reset regardless of such desires of the operator.

It is therefore an object of the present invention to provide a multi-component system capable of resetting only the CPU of a component in an abnormal condition at timing desired by the operator to thereby remove the problem.

Another object of the present invention is to provide a multi-component system capable of resetting only the CPU of a component in an abnormal condition at timing at which data processed by the CPU is kept secured.

To achieve the above object, there is provided according to the present invention a multi-component system in which a plurality of components each of which including at least a CPU are connected via a common bus to each other. The multi-component system includes a first reset signal generating unit which generates a reset signal in response to a switch operation and which supplies the reset signal to the respective components and a judge unit which is disposed in each of the components and which determines whether or not resetting of the CPU of the component is allowed. If the CPU is in a normal condition in the system, the judge unit inhibits the resetting of the CPU in response to the reset signal from the first reset signal generating unit and resets, if the CPU is in an abnormal condition, the CPU in response to the reset signal from the first reset signal generating unit.

According to the present invention, there is arranged a second reset signal generating unit for each component. When the CPU of each component is in a normal condition, the CPU sends life information via the common bus to an other component and acquires life information from the other component to determine whether or not the other CPU is in a normal condition. If the CPU of the components determines that the other CPU of the other component is in an abnormal condition, the second reset signal generating unit of the CPU generates a reset signal to supply the signal to the judge units of the other components.

According to the present invention, in a situation wherein the CPU of each component is in a normal condition, if a CPU of a component drops to an abnormal condition, data processed by the CPU in the abnormal condition is obtained through the common bus and then the second reset signal generating unit generates a reset signal.

Also, according to the present invention, each of the components includes condition detecting unit which detects a condition of the CPU, and the judge unit determines whether or not resetting of the CPU of the component is allowed according to a result of the detection by the condition detecting unit.

Additionally, according to the present invention, the condition detecting unit is a watchdog timer which is cleared (reset) at a predetermined period by the CPU and which detects, when the timer clear operation is suspended, that the condition of the CPU is abnormal.

According to the present invention, only the CPU of a component in an abnormal condition can be reset at timing desired by the operator, and the other CPUs of the other components in a normal condition can continue processing.

Also, according to the present invention, the CPU of any component in a normal condition can access the component the CPU of which is in an abnormal condition. It is possible that the CPU in the component in the normal condition executes processing, for example, processing to secure results processed by the component in the abnormal condition, and then the CPU in the abnormal condition can be automatically reset. Even if the resetting is thus carried out, the processing executed by the component in the abnormal condition is effectively used.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENTS

Figure 1:
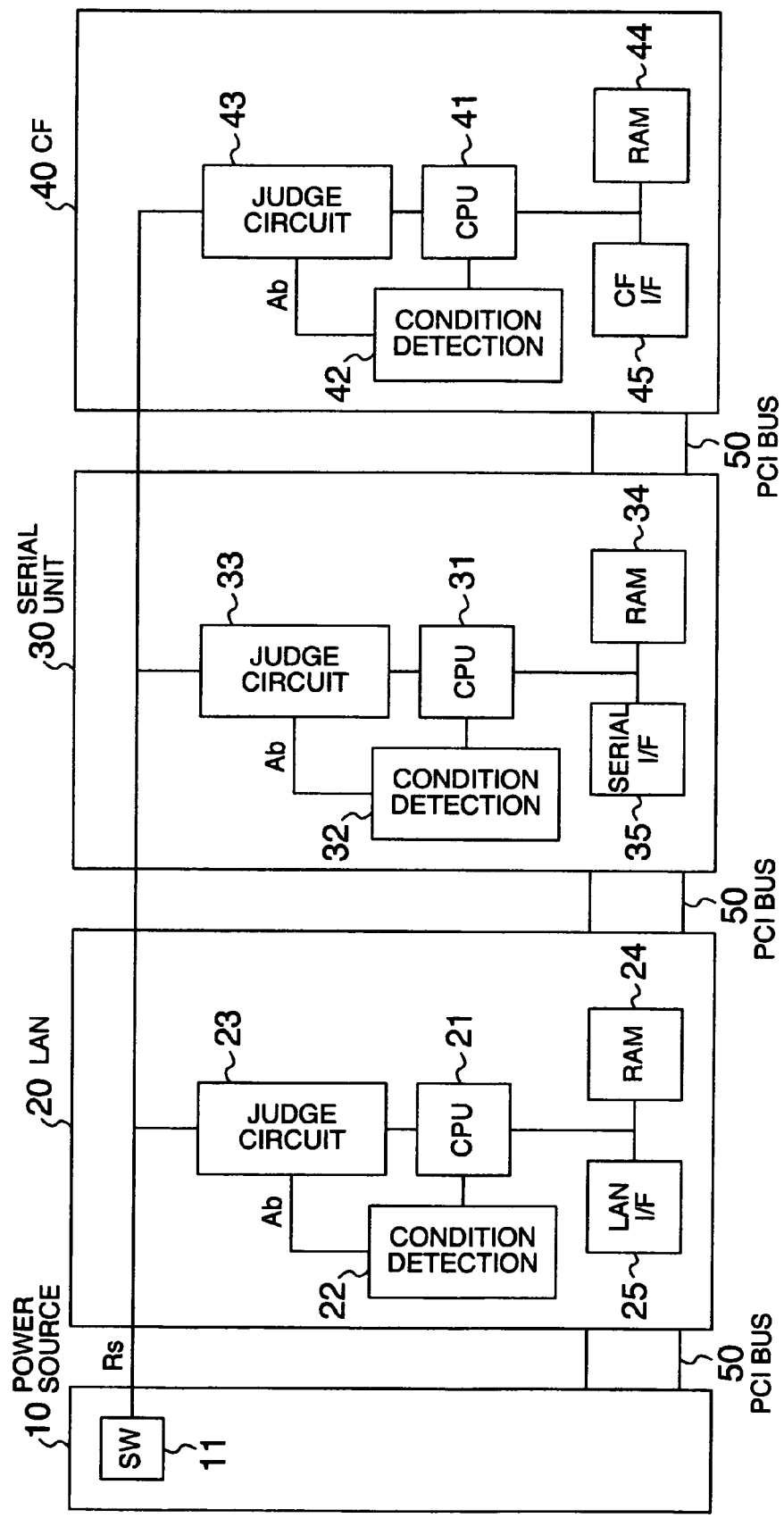
FIG. 1 is an overall perspective view showing a first embodiment of a multi-component system according to the present invention.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

Referring now to the drawings, description will be given of embodiments of the present invention.

Description will be given of embodiments by using, as an example, a Programmable Logic Controller (PLC) employed to control a machine or the like. However, the present invention is not restricted by the embodiments, but is applicable to any system including a plurality of components each of which includes at least a CPU.

FIG. 1 schematically shows main sections of a first embodiment of a multi-component system according to the present invention. The system includes a power source 10, a reset switch 11, an LAN 20, a serial units 30, a Compact Flash (CF; registered trademark) 40, CPUs 21, 31, and 41; condition detecting units 22, 32, and 42; judge circuits 23, 33, and 43; memories 24, 34, and 44; an LAN Interface (I/F) 25, a serial I/F 35, a CF I/F 45, and a Peripheral Component Interconnect (PCI) Bus 50.

In FIG. 1, the first embodiment includes the power source 10 in addition to the components such as the LAN 20, the serial unit 30, and the CF 40. These components 20, 30, and 40 are mutually connected via the PCI bus 50 to each other.

The LAN 20 includes the CPU 21, the memory 24 to store therein a program which the CPU 21 executes and data for which the CPU 21 conducts processing, the LAN I/F 25, and the condition detecting unit 22 and the judge circuit 23 which are used to reset the CPU 21. The LAN 20 is a component to conduct communication by the LAN I/F 25 with the internet. Similarly, the serial unit 30 includes the CPU 31, the memory 34 to store therein a program which the CPU 31 executes and data for which the CPU 31 conducts processing, the LAN I/F 35, and the condition detecting unit 32 and the judge circuit 33 which are used to reset the CPU 31. The serial unit 30 is a component to conduct communication by the LAN I/F 35 with an external device according to, for example, the RSC232C standard. Similarly, the CF 40 includes the CPU 41, the memory 44 to store therein a program which the CPU 41 executes and data for which the CPU 41 conducts processing, the LAN I/F 45, and the condition detecting unit 42 and the judge circuit 43 which are used to reset the CPU 41. The CF 40 is a component to conduct communication by the LAN I/F 45 with a recording medium such as a CF card. In this way, the components 20, 30, 40 do not divide the overall processing among them, but respectively execute mutually independent processings.

The power source 10 includes various operation switches such as a power switch, not shown, and a reset switch 11. When, for example, the operator operates the reset switch 11, a high-level reset signal Rs is generated from a reset signal generator or generating unit, not shown, and is fed to respective components (the LAN 20, the serial unit 30, and the CF 40).

Figure 2:
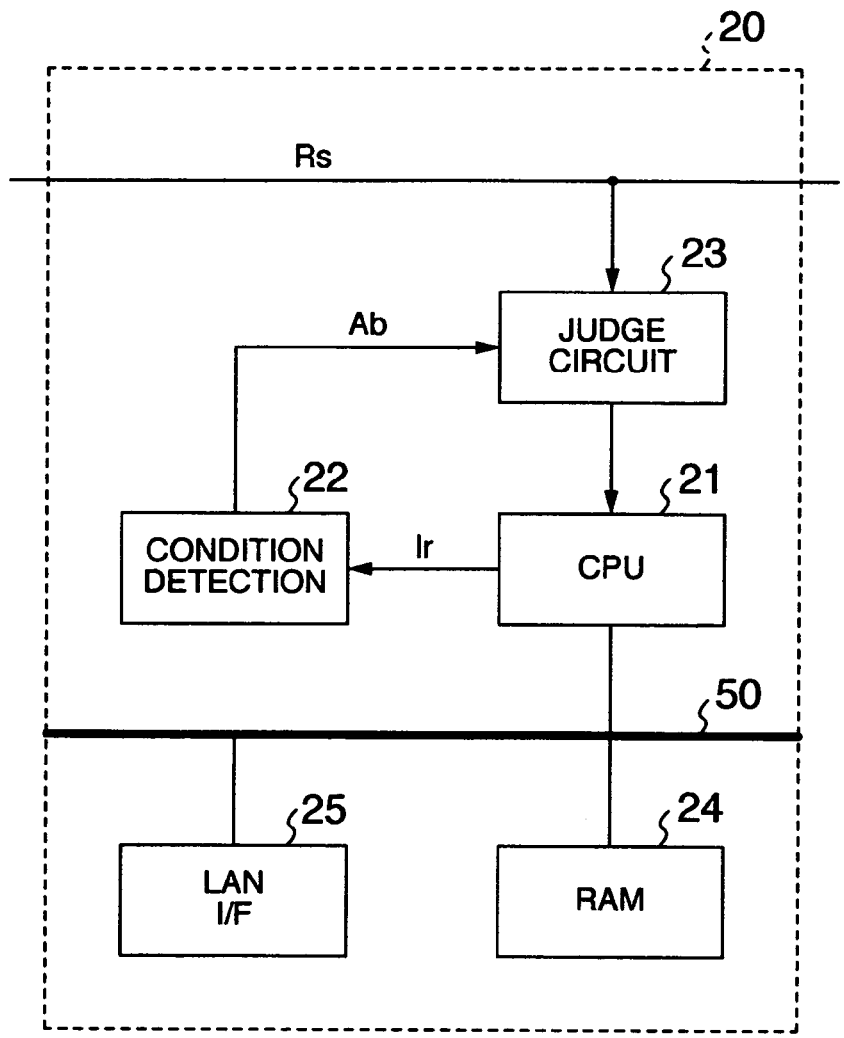
FIG. 2 is a circuit diagram showing a concrete configuration of primary sections of components in FIG. 1.

FIG. 2 shows, in a circuit diagram, specific structure of primary sections of the LAN 20 as one of the components shown in FIG. 1. In FIG. 2, the sections corresponding to those of FIG. 1 are assigned with the same reference numerals.

In FIG. 2, the CPU 21, the RAM 24, and the LAN I/F 25 are connected via the PCI bus 50 to each other. The CPU 21 conducts via the PCI bus 50 readout and writing of data from and in the RAM 24 to carry out processing and controls via the PCI bus 50 respective components such as the LAN I/F 25. The CPU 21 is connected to the condition detecting unit 22 and the judge circuit 23. Due to the configuration, when the CPU 21 drops to an abnormal condition, the CPU 21 is reset by the reset signal Rs supplied in response to an operation of the reset switch 11 in the power source, which will be described later.

The configuration is similarly applied to the serial unit 30 and the CF 40 of FIG. 1. These components, i.e., the LAN 20, the serial unit 30, and the CF 40 are mutually connected via the PCI bus 50 to each other.

In the LAN 20, the condition detecting unit 22 is, for example, a WDT. The WDT includes a counter which is reset in response to an interruption signal Ir from the CPU 21. The CPU 21 generates the interruption signal Ir at regular intervals. Each time the signal Ir is supplied to the WDT, the WDT is reset, namely, the WDT resets its value to an initial value to start the counting operation. When the CPU 21 becomes abnormal, the CPU 21 cannot supply the signal Ir to the WDT, and hence the WDT continues the counting to cause an overflow. At occurrence of the overflow, the WDT generates an abnormality signal Ab and supplies the signal Ab to the judge circuit 23.

In a situation wherein the abnormality signal Ab is not supplied from the abnormal condition detecting unit 22, the judge circuit 23 determines that the CPU 21 is in a normal condition and determines not to reset the CPU 21. When the abnormality signal Ab is supplied from the abnormal condition detecting unit 22, the judge circuit 23 determines that the CPU 21 is in an abnormal condition and determines to reset the CPU 21. When the reset signal Rs is supplied, the judge circuit resets the CPU 21.

Figure 3:
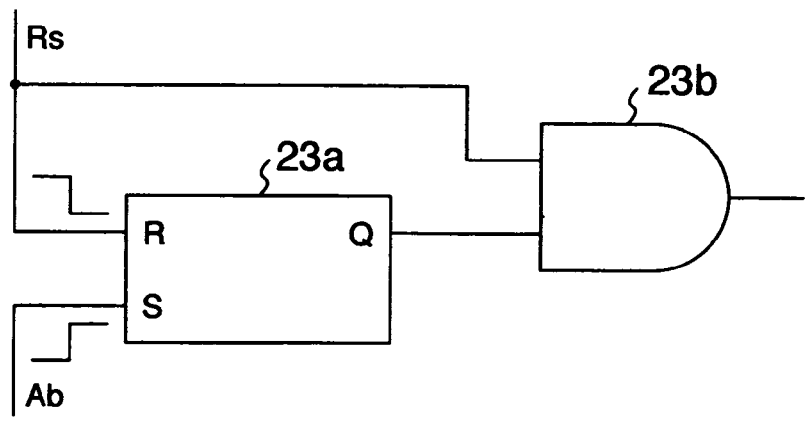
FIG. 3 is a circuit diagram showing a concrete example of a judge circuit in FIG. 1.

FIG. 3 shows a concrete example of the judge circuit 23 in a circuit diagram. The circuit 23 includes an Set/Reset Multivibrator (S/R MM) 23a and an AND gate 23b.

In FIG. 3, the S/R MM 23a is reset by a terminal edge (falling edge) of a high-level reset signal Rs supplied when the reset switch 11 (FIG. 1) of the power source (FIG. 1) is operated. The S/R MM 23a is set by an initial edge of the abnormal signal Ab from the condition detecting unit 22 (FIG. 1). In "set" state, a high-level Q output signal is produced therefrom. The Q signal is supplied as a first input to the AND gate 23b, and the reset signal Rs is supplied as a second input thereto. If the S/R MM 23a is in the set state due to the abnormal signal Ab from the condition detecting unit 22, the reset signal Rs produced in response to the operation of the reset switch 11 passes through the AND gate 23b. The reset signal Rs is fed to the CPU 21 (FIGS. 1 and 2) to reset the CPU 21.

Next, description will be given of operation of the first embodiment by referring to FIG. 1.

When the CPU 21, 31, and 41 are normally operating in the components, i.e., the LAN 20, the serial unit 30, and CF 40, it is natural that, for example, a control objective device which is not shown normally operates in the system. However, if either one of the CPUs of the components drops to an abnormal condition, the operation of the control objective device is affected by the abnormal condition of the CPU. Hence, the operator can recognize occurrence of an abnormality in either one of the components in the system. If the operator accordingly operates the reset switch 11, the reset signal Rs is generated to be delivered to the LAN 20, the serial unit 30, and CF 40.

On the other hand, in one of the components, for example, the LAN 20, if the CPU drops to the abnormal condition, the condition detecting unit 22 detects the abnormal condition and supplies the abnormality signal Ab to the judge circuit 23 as described above. The judge circuit 23 judges that the CPU 21 is in the abnormal condition and allows resetting of the CPU 21. If the reset signal Rs is supplied from the power source 10 in this situation, the judge circuit 23 feeds the reset signal Rs to the CPU 21. This resultantly resets the CPU 21.

In the components in which the CPUs are in the normal condition, i.e., the serial unit 30 and the CF 40, since the condition detecting units 32 and 42 detect the normal condition of the CPU 31 and 41 and hence do not generate the abnormality signal Ab. The judge circuit 33 and 43 judges that the CPUs 31 and 41 are in the normal condition and inhibit resetting thereof. Hence, even if the reset signal Rs is supplied to the CPUs 31 and 41, the CPUs 31 and 41 are not reset and continues processing.

As above, in a situation in which a CPU in either one of the components is in an abnormal condition and an abnormality occurs in the system, even if the operator does not or cannot recognize the component associated with the abnormality, it is possible for the operator to securely reset solely the CPU of the component in the abnormal condition. The operator need only recognize the system abnormality to operate the reset switch 11. This avoids an undesirable event in which the CPUs of the components operating in the normal condition are reset.

The CPU of the component in the abnormal condition is reset in response to the operation of the reset switch 11 by the operator, namely, in response to the request from the operator. Therefore, the operator can determine timing to reset the CPU. For example, after conducting a predetermined operation for the control objective device or after securing, if possible, data processed by the pertinent CPU up to this point, the operator may operate the reset switch 11 to reset the CPU of the component in the abnormal condition. If it is possible to secure the processed data, the data can be used when the pertinent CPU is reactivated, and hence the processing up to the point immediately before the occurrence of the abnormality can be effectively used.

Figure 4:
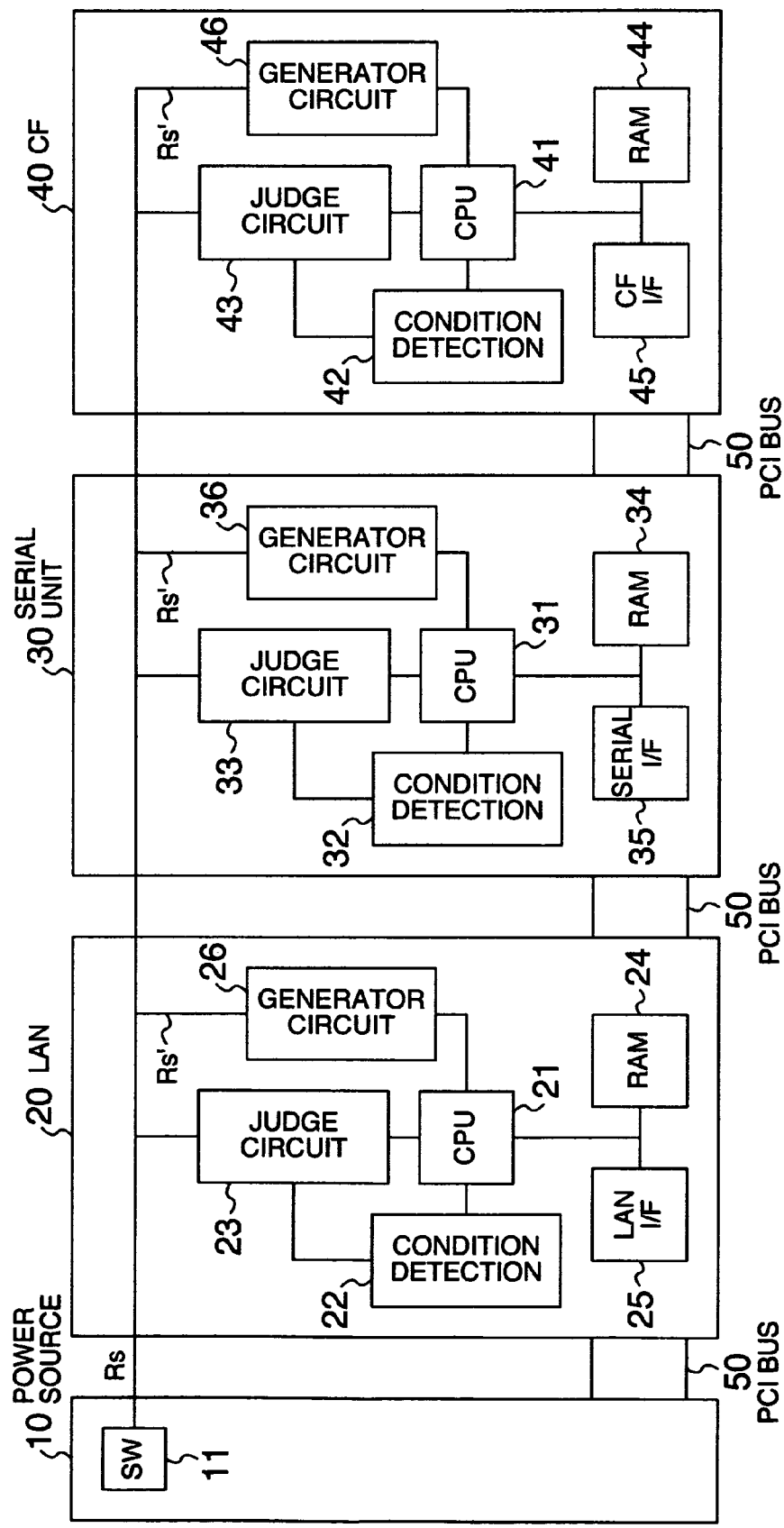
FIG. 4 is an overall perspective view showing a second embodiment of a multi-component system according to the present invention.

FIG. 4 shows a second embodiment of a multi-component system according to the present invention in a block diagram. The embodiment includes reset signal generator circuits 26, 36, and 46. In FIG. 4, the sections corresponding to FIG. 1 are assigned with the same reference numerals, and duplicated description thereof will be avoided.

The second embodiment of FIG. 4 is implemented by adding the reset signal generator circuits 26, 36, and 46 respectively to the components, i.e., the LAN 20, the serial unit 30, and the CF 40 of the first embodiment shown in FIG. 1. When the reset switch 11 is operated, each of the reset signal generator circuits 26, 36, and 46 generates a reset signal Rs' in a format substantially equal to that of the reset signal Rs. When the CPU of either one of the LAN 20, the serial unit 30, and the CF 40 becomes abnormal, each of the CPUs in a normal condition generates the reset signal Rs'. The component in the abnormal condition obtains the signal Rs' via the judge circuit to reset the CPU in the abnormal condition.

Figure 5:
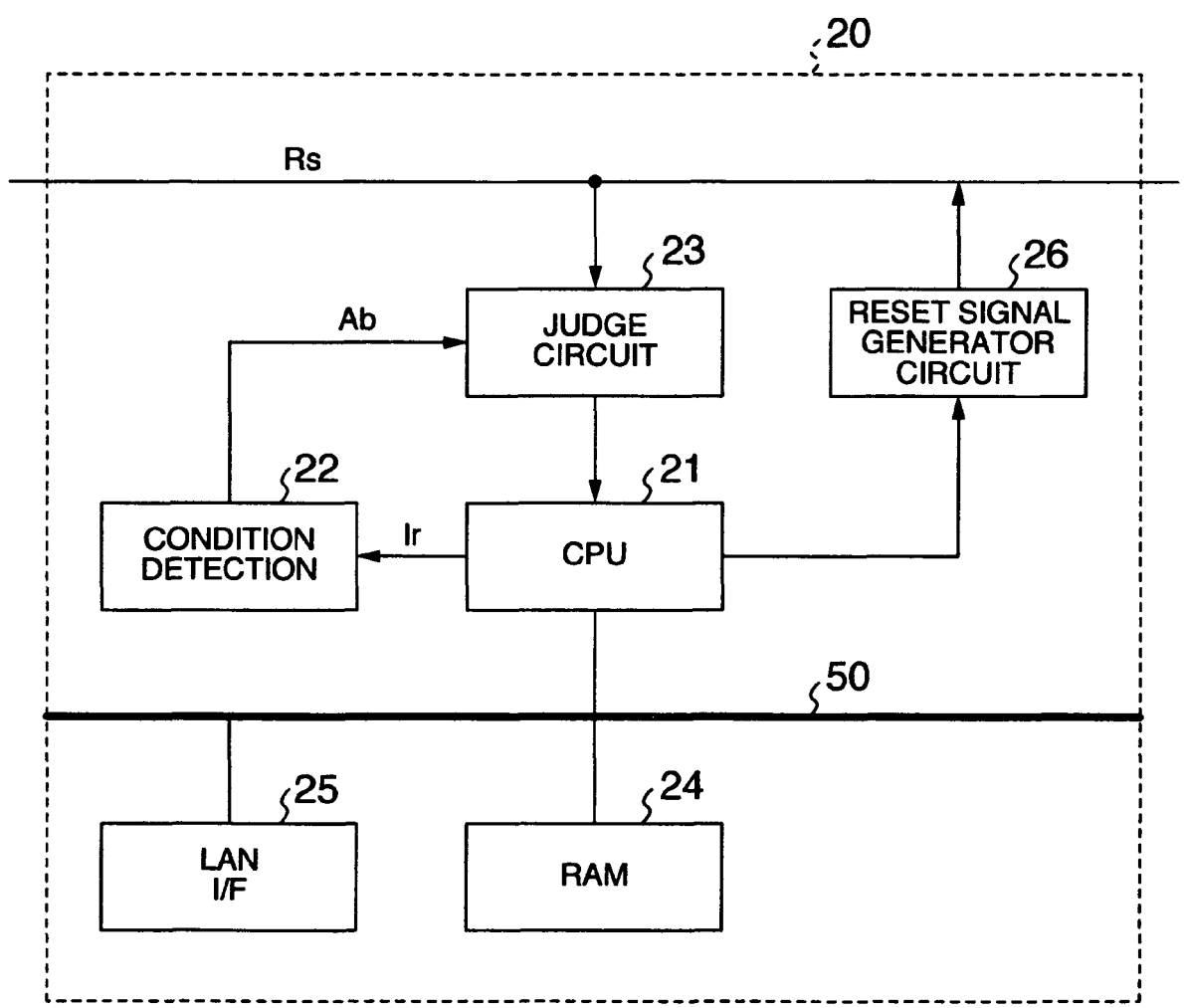
FIG. 5 is a circuit diagram showing a concrete configuration of primary sections of components in FIG. 4.

As FIG. 5 shows, the CPU 21, the RAM 24, and the LAN I/F 25 are coupled via the PCI bus with each other. The CPU 21 conducts via the PCI bus 50 readout and writing of data from and in the RAM 24 to carry out processing and controls via the PCI bus 50 respective components such as the LAN I/F 25. The CPU 21 is connected to the condition detecting unit 22, the judge circuit 23, and the reset signal generator circuit 26. Due to the configuration, when the CPU 21 drops to an abnormal condition, the CPU 21 is reset by the reset signal Rs supplied in response to an operation of the reset switch 11 in the power source 10 as in the first embodiment. Moreover, the generator circuit 26 is capable of generating a reset signal Rs' in a format substantially equal to that of the reset signal Rs. In the second embodiment, the CPU 21 can communicate via the PCI bus 50 with the other components, i.e., the serial unit 30 and the CF 40.

The configuration is similarly applied to the serial unit 30 and the CF 40 of FIG. 1. These components, i.e., the LAN 20, the serial unit 30, and the CF 40 are mutually connected via the PCI bus 50 to each other. Among the LAN 20, the serial unit 30, and the CF 40, required data is communicated, which will be described later.

In an normal condition, each of the CPUs 21, 31, and 41 of the respective components sends life information indicating that the CPU is in the normal condition via the PCI bus 50 to the other components at regular intervals. Hence, each CPU in the normal condition continuously recognizes whether or not the CPUs of the other components are in the normal condition.

Assume that the CPU 31 of the serial unit 30 drops to an abnormal condition. As in the first embodiment, this results in a situation in which the judge circuit 33 has allowed the resetting of the CPU 31 and the CPU 31 does not output the life information to the PCI bus 50. Hence, the LAN 20 and the CF 40 become a situation in which none of the CPUs 21 and 41 can obtain the life signal from the serial unit 30. Resultantly, the CPUs 21 and 41 recognize that the CPU 31 of the serial unit 30 is in the abnormal condition.

One of the CPUs 21 and 41, for example, the CPU 21 then executes predetermined processing for the serial unit 30. After the processing is finished, the CPU 21 controls the reset generator circuit 26 to generate the reset signal Rs'. The signal Rs' is fed to the serial unit 30 and the CF 40. In the serial unit 30, the judge circuit 33 has determined to allow the resetting of the CPU 31 and hence sets the AND gate 23b (FIG. 3) to an ON state (that is, the judge circuit 33 is in an ON state). Therefore, at reception of the reset signal Rs' generated by the generator circuit 26 of the LAN 20, the judge circuit 33 is reset on the basis of the signal Rs'.

The predetermined processing executed by the CPU 21 for the serial unit 30 before the reset generator circuit 26 generates the reset signal Rs' is, for example, as follows. If the CPU 21 detects that the CPU 31 is in the abnormal condition, the CPU 21 executes processing in which a processing program and data are read via the PCI bus 50 from the RAM 34 of the serial unit 30 to store the program and the data in the RAM 24. This secures the result (processed data) of the processing executed by the CPU 31 up to the point immediately before the transition to the abnormal condition so that the CPUs other than the CPU 31 or the CPU 31 after the reactivation thereof can continuously execute processing beginning at a point immediately before the transition to the abnormal condition. Therefore, the result of processing executed by the CPU 31 up to the point immediately before the transition to the abnormal condition will be effectively used. This also makes it possible to control via the PCI bus 50 the serial I/F 35 to continuously execute processing of the serial unit 30.

When the CF 40 is normally operating, the judge circuit 43 judges that the CPU 41 is in the normal condition to inhibit the resetting of the CPU 41. In the CF 40, the judge circuit 43 blocks the reset signal Rs' generated by the generator circuit 26 of the LAN 20, and hence the CPU 41 is not reset.

It is possible that when the CPU of either one of the components drops to abnormal condition, the CPUs of the remaining normal components generate the reset signal Rs' by the reset generator circuits. However, in a situation wherein priority levels are assigned the components and the CPU of either one of the components drops to the abnormal condition, it is also possible that the component having the highest priority level among the remaining normal components generates the reset signal Rs' by the reset generator circuit.

In a situation wherein the PCI bus 50 fails and communication is impossible, even if the CPUs 21, 31, and 41 respectively output life information pieces to the PCI bus 50, either one piece of the life information is not transmitted to the CPUs of the other components. For example, if the PCI bus fails between the serial unit 30 and the CF 40 in FIG. 4, the CPU 21 of the LAN 20 cannot receive life information from the CF 40. Hence, the CPU 41 of the CF 40 is judged to be abnormal, and then the reset signal generator circuit 26 generates the reset signal Rs'. The signal Rs' is also fed to the CF 40. Since the CPU 41 of the CF 40 is outputting life information and is in a normal condition, the judge circuit 43 determines not to allow the resetting of the CPU 41. Therefore, even if the reset signal Rs' is received from the LAN 20, the judge circuit 43 rejects the reset signal Rs' and the CPU 41 is not reset.

Even if the PCI bus 50 fails and life information is not transmitted, the CPUs in the normal condition is not reset and continues processing. In this situation, the reset signal Rs' is continuously outputted. This makes it possible to detect an abnormality of the PCI bus 50.

As above, also in the second embodiment, an advantage similar to that of the first embodiment in which the reset switch 11 is operated is attained. Additionally, even if the operator does not operate the switch, the CPU of the component in the abnormal condition can be automatically reset and the data resultant from the processing up to this point is kept effective in the second embodiment.

Furthermore, in each of the first and second embodiments, the condition detecting unit 22, 32, and 42 respectively detects abnormalities associated with hardware of the CPU 21, 31, and 41. However, for example, it is also possible to dispose units to detect an abnormality associated with software, such as an error of a program. Detected results are also supplied respectively to the judge circuits 23, 33, and 43 to reset the CPU associated with the software error as well as the occurrence of a hardware abnormality of the CPUs 21, 31, and 41.

The invention claimed is:

1. A multi-component system in which a plurality of components, each of which includes at least a CPU, are connected via a common bus to each other, comprising:
    a first reset signal generating unit which generates a reset signal (Rs) in response to a switch operation and which supplies the reset signal to the respective components; and
    a judge unit which is disposed in each of the components and which determines whether or not resetting of the CPU of the component is allowed,
    wherein the judge unit of the component inhibits, if the CPU of the same component is in a normal condition, the resetting of the CPU in response to the reset signal from the first reset signal generating unit and resets, if the CPU of the same component is in an abnormal condition, the CPU in response to the reset signal from the first reset signal generating unit.

2. A multi-component system according to claim 1, wherein each of the components includes a condition detecting unit which detects a condition of the CPU in the component, and
    the judge unit determines whether or not resetting of the CPU of the component is allowed according to a result of the detection by the condition detecting unit.

3. A multi-component system according to claim 1, wherein the condition detecting unit is a watchdog timer which is cleared at a regular intervals by the CPU and which detects, when the timer clear operation is suspended, that the condition of the CPU is abnormal.

4. A multi-component system in which a plurality of components, each of which includes at least a CPU, are connected via a common bus to each other, comprising:
    a first reset signal generating unit which generates a first reset signal (Rs) in response to a switch operation and which supplies the first reset signal to the respective components; and
    a judge unit which is disposed in each of the components and which determines whether or not resetting of the CPU of the component is allowed,
    wherein the judge unit of the component inhibits, if the CPU of the same component is in a normal condition, the resetting of the CPU in response to the first reset signal from the first reset signal generating unit and resets, if the CPU of the same component is in an abnormal condition, the CPU in response to the first reset signal from the first reset signal generating unit,
    wherein each of the CPUs of the respective components outputs life information when the CPU is in the normal condition and supplies the life information via the common bus to the other components, and the CPU receives the life information from the other components and thereby determines whether or not each of the CPUs of the other components is in the normal condition, and
    wherein the multi-component system further comprises a second reset signal generating unit in each of the components and the second reset signal generating unit generates a second reset signal (R's) and supplies the second reset signal to the judge unit of each of the components when the CPU determines that the CPU in either one of the other components is in the abnormal condition.

5. A multi-component system according to claim 4, wherein each of the components includes a condition detecting unit which detects a condition of the CPU in the component, and the judge unit determines whether or not resetting of the CPU of the component is allowed according to a result of the detection by the condition detecting unit.

6. A multi-component system according to claim 4, wherein the condition detecting unit is a watchdog timer which is cleared at regular intervals by the CPU and which detects, when the timer clear operation is suspended, that the condition of the CPU is abnormal.

7. A multi-component system in which a plurality of components, each of which includes at least a CPU, are connected via a common bus to each other, comprising:

a first reset signal generating unit which generates a first reset signal (Rs) in response to a switch operation and which supplies the reset signal to the respective components; and a judge unit which is disposed in each of the components and which determines whether or not resetting of the CPU of the component is allowed, wherein the judge unit of the component inhibits, if the CPU of the same component is in a normal condition, the resetting of the CPU in response to the first reset signal from the first reset signal generating unit and resets, if the CPU of the same component is in an abnormal condition, the CPU in response to the first reset signal from the first reset signal generating unit, wherein each of the CPUs of the respective components outputs life information when the CPU is in the normal condition and supplies the life information via the common bus to the other components, and the CPU receives the life information from the other components and thereby determines whether or not each of the CPUs of the other components is in the normal condition, and wherein the multi-component system further comprises a second reset signal generating unit in each of the components, and the second reset signal generating unit generates a second reset signal (R's) and supplies the second-reset signal to the judge unit of each of the components if the CPU determines that the CPU in either one of the other components is in the abnormal condition, wherein each of the CPUs of the components in the normal condition obtains data processed by the CPU of the component which drops to the abnormal condition via the common bus and then controls the second reset signal generating unit to generate the second reset signal.

8. A multi-component system according to claim 7, wherein each of the components includes a condition detecting unit which detects a condition of the CPU in the component, and the judge unit determines whether or not resetting of the CPU of the component is allowed according to a result of the detection by the condition detecting unit.

9. A multi-component system according to claim 7, wherein the condition detecting unit is a watchdog timer which is cleared at regular intervals by the CPU and which detects, when the timer clear operation is suspended, that the condition of the CPU is abnormal.

* * * * *